United States Patent
Huang

(10) Patent No.: US 10,612,961 B2
(45) Date of Patent: Apr. 7, 2020

(54) METHOD FOR REAL-TIME MASS ESTIMATION OF A VEHICLE SYSTEM

(71) Applicant: GM Global Technology Operations LLC, Detroit, MI (US)

(72) Inventor: Xiaoyu Huang, Troy, MI (US)

(73) Assignee: GM GLOBAL TECHNOLOGY OPERATEONS LLC, Detroit, MI (US)

( * ) Notice: Subject to any disclaimer, the term of this patent is extended or adjusted under 35 U.S.C. 154(b) by 4 days.

(21) Appl. No.: 15/848,770

(22) Filed: Dec. 20, 2017

(65) Prior Publication Data

US 2019/0186985 A1  Jun. 20, 2019

(51) Int. Cl.
| | |
|---|---|
| G01G 19/00 | (2006.01) |
| G01G 19/03 | (2006.01) |
| G01G 19/08 | (2006.01) |
| G01M 17/00 | (2006.01) |
| G01M 17/007 | (2006.01) |

(52) U.S. Cl.
CPC ............ *G01G 19/08* (2013.01); *G01G 19/03* (2013.01); *G01G 19/086* (2013.01); *G01M 17/007* (2013.01); *B60T 2250/02* (2013.01)

(58) Field of Classification Search
CPC ........ G01G 19/00; G01G 19/03; G01G 19/08; G01M 17/00; G01M 17/008
See application file for complete search history.

(56) References Cited

U.S. PATENT DOCUMENTS

| | | | |
|---|---|---|---|
| 5,973,237 A | 10/1999 | Luedtke, Jr. et al. | |
| 6,167,357 A | 12/2000 | Zhu | |
| 6,567,734 B2 | 5/2003 | Bellinger et al. | |
| 7,818,140 B2* | 10/2010 | Dreier | F16H 61/0213 177/136 |
| 8,412,447 B2* | 4/2013 | Hecker | B60T 8/172 701/124 |
| 8,554,511 B2 | 10/2013 | Fujita | |
| 8,630,767 B2* | 1/2014 | Karlsson | G01G 19/086 701/33.1 |
| 8,725,324 B2* | 5/2014 | Jung | G01M 17/08 701/19 |
| 8,892,291 B2* | 11/2014 | Nedorezov | B60W 10/06 180/65.1 |
| 9,395,233 B2* | 7/2016 | Dourra | F16H 59/52 |
| 9,725,093 B2 | 8/2017 | Chunodkar et al. | |
| 10,124,806 B2* | 11/2018 | Raffone | B60W 40/13 |
| 10,166,980 B2* | 1/2019 | Fujii | B60W 10/06 |

(Continued)

OTHER PUBLICATIONS

Winstead, V. and I. V. Kolmanovsky (2005). Estimation of road grade arid vehicle mass via model predictive control. Proceedings of 2005 IEEE Conference on Control Applications, 2005. CCA 2005.

(Continued)

*Primary Examiner* — Yonel Beaulieu

(57) ABSTRACT

A method for estimating the mass of a vehicle system includes a number of steps including a first step of providing a vehicle system having at least a powertrain and a vehicle control module. Three different mass estimates are assigned with the last mass estimate being the most accurate. The mass estimates are used in the vehicle control module calculations for vehicle control parameters in the event that the weight of the vehicle changes.

20 Claims, 3 Drawing Sheets

(56) References Cited

U.S. PATENT DOCUMENTS

2011/0004382 A1 1/2011 Dreier
2013/0035829 A1 2/2013 Tiberg

OTHER PUBLICATIONS

Kober, W. and W. Hirschberg (2006). On-Board Payload Identification for Commercial Vehicles. 2006 IEEE International Conference on Mechatronics.
Massel, T., E. L. Ding, et al. (2004). Estimation of vehicle loading state. Proceedings of the 2004 IEEE International Conference on Control Applications, 2004.
Vahidi, A., A. Stefanopoulou, et al. (2005). "Recursive least squares with forgetting for online estimation of vehicle mass and road grade: theory and experiments." Vehicle System Dynamics 43(1): 31-55.
Hayakawa, K., R. Hibino, et al. (2006). On-Board Estimation of Vehicle Weight by Optimizing Signal Processing, SAE International.
Huh, K., S. Lim, et al. (2007). Vehicle Mass Estimator for Adaptive Roll Stability Control, SAE International.
Fathy, H. K., K. Dongsoo, et al. (2008). Online vehicle mass estimation using recursive least squares and supervisory data extraction. 2008 American Control Conference.
Pence, B. L., H. K. Fathy, et al. (2009). Sprung mass estimation for off-road vehicles via base-excitation suspension dynamics and recursive least squares. 2009 American Control Conference.
McIntyre, M. L., T. J. Ghotikar, et al. (2009). "A Two-Stage Lyapunov-Based Estimator for Estimation of Vehicle Mass and Road Grade." IEEE Transactions on Vehicular Technology 58(7): 3177-3185.
Han, K.-J., I.-K. Kim, et al. (2009). "Development and experimental evaluation of an online estimation system for vehicle mass," Proceedings of the Institution of Mechanical Engineers, Part D: Journal of Automobile Engineering 223(2): 167-177.
Rozyn, M. and N. Zhang (2010). "A method for estimation of vehicle inertial parameters." Vehicle System Dynamics 48(5): 547-565.
Kim, D., S. B. Choi, et al. (2012). Integrated vehicle mass estimation using longitudinal and roll dynamics. 2012 12th International Conference on Control, Automation and Systems.
Huang, X. and J. Wang (2012), "Longitudinal Motion Based Lightweight Vehicle Payload Parameter Real-Time Estimations." Journal of Dynamic Systems, Measurement, and Control 135(1): 011013-011013-011010.
Zhang, X., L. Xu, et al. (2013). Real-Time Estimation of Vehicle Mass and Road Grade Based on Multi-Sensor Data Fusion. 2013 IEEE Vehicle Power and Propulsion Conference (VPPC).
Wilhelm, E., L. Rodgers, et al. (2013). Real-time electric vehicle mass identification. 2013 World Electric Vehicle Symposium and Exhibition (EVS27).
Rezaeian, A., R. Zarringhalam, et al. (2013). Cascaded Dual Extended Kalman Filter for Combined Vehicle State Estimation and Parameter Identification. SAE International.
Kim, I., H. Kim, et al. (2013). "Development of estimation algorithms for vehicles mass and road grade." International Journal of Automotive Technology 14(6): 889-895.
Reineh, M. S., M. Enqvist, et al. (2014). IMU-based vehicle load estimation under normal driving conditions. 53rd IEEE Conference on Decision and Control.
Pence, B. L., H. K. Fathy, et al. (2014). "Recursive Estimation for Reduced-Order State-Space Models Using Polynomial Chaos Theory Applied to Vehicle Mass Estimation." IEEE Transactions on Control Systems Technology 22(1): 224-229.
Maleej, K., S. Kelouwani, et al. (2014). Event-Based Electric Vehicle Mass and Grade Estimation. 2014 IEEE Vehicle Power and Propulsion Conference (VPPC).
Mahyuddin, M. N., J. Na, et al. (2014). "Adaptive Observer-Based Parameter Estimation With Application to Road Gradient and Vehicle Mass Estimation." IEEE Transactions on Industrial Electronics 61(6): 2851-2863.
Maalej, K., S. Kelouwani, et al. (2014). "Enhanced fuel cell hybrid electric vehicle power sharing method based on fuel cost and mass estimation." Journal of Power Sources 248(Supplement C): 668-678.
Kidambi, N., R. L. Harne, et al. (2014). "Methods in Vehicle Mass and Road Grade Estimation." SAE International.
Jordan, J., N. Hirsenkorn, et al. (2014). Vehicle mass estimation based on vehicle vertical dynamics using a multi-model filter. 17th International IEEE Conference on Intelligent Transportation Systems (ITSC).
Yang, J., J. Na, et al. (2015). "Adaptive estimation of road gradient and vehicle parameters for vehicular systems." IET Control Theory & Applications 9(6): 935-943.
Wang, L., H. Zheng, et al. (2015). Vehicle Mass Estimation for Heavy Duty Vehicle, SAE International.
Sun, Y., L. Li, et al. (2016). "A hybrid algorithm combining EKF and RLS in synchronous estimation of road grade and vehicle mass for a hybrid electric bus." Mechanical Systems and Signal Processing 6869: 416-430.
Marzbanrad, J. and I. Tahbaz-zadeh Moghaddam (2016). "Self-tuning control algorithm design for vehicle adaptive cruise control system through real-time estimation of vehicle parameters and road grade." Vehicle System Dynamics 54(9): 1291-1316.
Chen, M., G. Yin, et al. (2016). Joint estimation of center of gravity position and mass for the front and rear independently driven electric vehicle with payload in the start stage, 2016 35th Chinese Control Conference (CCC).
Yu, Z. and J. Wang (2017). "Simultaneous Estimation of Vehicles Center of Gravity and Inertial Parameters Based on Ackermanns Steering Geometry." Journal of Dynamic Systems, Measurement, and Control 139(3): 031006-031006-031013.
Reina, G., M. Faiano, et al. (2017). "Vehicle parameter estimation using a model-based estimator." Mechanical Systems and Signal Processing 87, Part B: 227-241.
Li, B., J. Zhang, et al. (2017). "Two-layer structure based adaptive estimation for vehicle mass and road slope under longitudinal motion." Measurement 95: 439-455.
Ghosh, J., S. Foulard, et al. (2017). Vehicle Mass Estimation from CAN Data and Drivetrain Torque Observer, SAE International.
Rhode, S. and F. Gauterin (2012). Vehicle mass estimation using a total least-squares approach, 2012 15th International IEEE Conference on Intelligent Transportation Systems.
Karoshi, P., M. Ager, et al. (2018). Robust and Numerically Efficient Estimation of Vehicle Mass and Road Grade. Advanced Microsystems for Automotive Applications 2017: Smart Systems Transforming the Automobile. C. Zachus, B. Mller and G. Meyer. Cham, Springer International Publishing: 87-100.

* cited by examiner

METHOD FOR REAL-TIME MASS ESTIMATION OF A VEHICLE SYSTEM

FIELD

The present disclosure relates to a method of estimating the real-time mass of a vehicle and more particularly a method of estimating the real-time mass of a vehicle utilizing existing hardware in the vehicle.

BACKGROUND

The statements in this section merely provide background information related to the present disclosure and may or may not constitute prior art.

The determination of vehicle mass is important to the efficient operation of today's vehicles, especially in highly efficient light and heavy duty trucks, increasingly capable autonomous driving vehicles, and continuously developed electric powered vehicles. For example, vehicle mass is an input consideration for algorithms for proper gear changing control in a transmission having staged gears or motor torque output control for an electric powered vehicle. Vehicle mass may also be used by various vehicle controllers in anti-lock brake systems, intelligent vehicle/highway systems and fleet management systems, to name a few. In addition, vehicle mass can be useful in speed control systems, such as for use with an active speed control system. One problem with using vehicle mass estimation as a control parameter is that it varies with vehicle loading and configuration and is usually difficult to predict with minimal error. For example, the mass of a medium sized sedan can increase several hundred pounds when going from zero passengers to having a full capacity vehicle. Adding four passengers at 150 lbs. each is a total of 600 lbs. which can add approximately 25% to the weight of the vehicle. This can cause significant differences between the best operating parameters for the vehicle and how the vehicle is actually operated.

Because the mass of a particular vehicle may vary greatly, a means for accurately estimating actual vehicle mass when the vehicle is in operation is required if the dynamic vehicle mass is to be used as a control parameter. Thus, if the mass parameter is fixed at a particular value in the control system, then the various control features described above will not allow for optimal vehicle performance under all types of load, road, and driving conditions.

Vehicle acceleration is typically measured by an accelerometer in the vehicle. However, one of the problems associated with the collection of speed data is that speed signal is typically very noisy. When vehicle acceleration is used to estimate the vehicle mass, the noise problem is even more significant. In order to determine acceleration, it is often necessary to measure the increase or decrease in speed values at very close time intervals. This differentiation in speed values at close time intervals causes the acceleration signal to be buried in the noise of the speed signal. Inaccurate determinations of vehicle acceleration and a correspondingly inaccurate determination of vehicle mass may result. The various controllers relying on an accurate vehicle mass determination may in turn perform ineffectively and inefficiently.

What is therefore needed is a technique for estimating vehicle mass that addresses the foregoing shortcomings as well as other deficiencies. Such a technique should provide reliable, more accurate estimates of vehicle mass. The technique should also be inexpensive to implement, and be readily integrated into existing vehicle control systems.

SUMMARY

The present invention provides a method for estimating the mass of a vehicle system. The method comprises a number of steps including a first step of providing a vehicle system having a vehicle control module and a powertrain having an ignition system. A second step detects if the ignition system of the vehicle system is on. A third step initializes an initial mass $M_0$ representing a most recent estimated mass $M_{est}$ in a stored memory of the vehicle control module. A fourth step detects if the vehicle system is traveling in a straight line until the vehicle system is detected traveling in a straight line. A fifth step estimates a first estimated mass $M_1$ using the equation $$M_1 = \frac{F_d - K_b P_b - K_a V_x^2}{(a_x + \mu g)}.$$

A sixth step detects an event in which a change in acceleration occurs including the acceleration of the vehicle system changes from positive to negative or the acceleration of the vehicle system changes from negative to positive. A seventh step records a first and a second data points. The first data point is when the velocity of the vehicle system is $V_x$ before the event in which a change in acceleration occurs. The second data point is when the velocity of the vehicle system is $V_x$ after the event in which a change in acceleration occurs. An eighth step estimates a second estimated mass $M_2$ using the equation $$M_2 = \frac{(F_{dB} - F_{bB}) - (F_{dA} - F_{bA})}{(a_{xB} - a_{xA})}.$$

In one example of the present invention, the method for estimating the mass of a vehicle system further comprises setting a new estimated mass $M_{est}$ from the initial, first estimated, and second estimated mass $M_0$, $M_1$, $M_2$.

In another example of the present invention, setting a new estimated mass $M_{est}$ from the initial, first estimated, and second estimated mass $M_0$, $M_1$, $M_2$ further comprises setting a new estimated mass $M_{est}$ from the initial, first estimated, and second estimated mass $M_0$, $M_1$, $M_2$. The new estimate mass $M_{est}=M_2$ if $M_2$ has been calculated. The new estimated mass $M_{est}=M_1$ if $M_2$ has not been calculated. The new estimated mass $M_{est}=M_0$ if each of $M_1$ and $M_2$ have not been calculated.

In yet another example of the present invention, the method for estimating the mass of a vehicle system further comprises communicating the new estimated mass $M_{est}$ to the vehicle control module.

In yet another example of the present invention, estimating a first estimated mass $M_1$ using the equation $$M_1 = \frac{F_d - K_b P_b - K_a V_x^2}{(a_x + \mu g)}$$

further comprises estimating a second estimated mass $M_1$ using the equation $$M_1 = \frac{F_d - K_b P_b - K_a V_x^2}{(a_x + \mu g)}$$

and $F_d$ is a drive force, $P_b$ is a brake pressure, and $K_a V_x^2$ is an aerodynamic force.

In yet another example of the present invention, estimating a second estimated mass $M_2$ using the equation $$M_2 = \frac{(F_{dB} - F_{bB}) - (F_{dA} - F_{bA})}{(a_{xB} - a_{xA})}$$

further comprises estimating a third estimated mass $M_3$ using the equation $$M_2 = \frac{(F_{dB} - F_{bB}) - (F_{dA} - F_{bA})}{(a_{xB} - a_{xA})}$$

and $F_{dA}$ and $F_{dB}$ are drive forces, $F_{bA}$ and $F_{bB}$ are brake forces, and $a_{xA}$ and $a_{xB}$ are measured acceleration.

In yet another example of the present invention, estimating a second estimated mass $M_2$ using the equation $$M_2 = \frac{(F_{dB} - F_{bB}) - (F_{dA} - F_{bA})}{(a_{xB} - a_{xA})}$$

further comprises estimating a third estimated mass $M_3$ using the equation $$M_2 = \frac{(F_{dB} - F_{bB}) - (F_{dA} - F_{bA})}{(a_{xB} - a_{xA})}$$

and $F_{dA}$ is the drive force at the first data point, $F_{dB}$ is the drive force a the second data point, $F_{bA}$ is the brake force at the first data point, $F_{bB}$ is the brake force at the second data points, and $a_{xA}$ and $a_{xB}$ are the measured acceleration at the first and second data points, respectively.

The present invention provides a vehicle system having a vehicle body, a powertrain, at least two wheels, a brake system, a suspension system, and a vehicle control module. The vehicle body has a frontal area A having a constant $K_a$. The powertrain is disposed within the body of the vehicle system and has an ignition system. The powertrain selectively provides a drive force $F_d$ on the vehicle system. The brake system is disposed in the body and the at least two wheels. The brake system selectively provides a brake force $F_b$ on the vehicle system. The suspension system is disposed between the at least two wheels and the body and powertrain. The suspension system supports the body and powertrain upon the at least two wheels. The vehicle control module is electronically connected to the vehicle system and has control logic operable to control a plurality of dynamic driving parameters of the vehicle system, the control logic including. The first control logic detects if the vehicle system ignition is on and the powertrain is running. The second control logic initializes a variable $M_0$ representing the most recent estimated mass $M_{est}$ in memory. The third control logic detects if the vehicle system is traveling in a straight line. If the vehicle system is not traveling in a straight line the third control logic repeats until the vehicle system is traveling in a straight line. The fourth control logic estimates a first vehicle mass $M_1$ using the equation $$M_1(a_x + \mu g) = F_d - K_b P_b - K_a V_x^2.$$

The fifth control logic detects if the number of data points at the set velocity $V_x$ has exceeded 1. If the number of data points at the set velocity $V_x$ has not exceeded 1 the fifth control logic repeats until the number of data points at the set velocity $V_x$ has exceeded 1 and recording a first and a second data points, the first data point is recorded the at the first time the set velocity $V_x$ is reached, and the second data point is recorded at the second time the set velocity $V_x$ is reached. The sixth control logic estimates a second vehicle mass $M_2$ using the equation $$M_2(a_{xB} - a_{xA}) = (F_{dB} - F_{bB}) - (F_{dA} - F_{bA}).$$

In one example of the present invention, the vehicle system of further comprises a seventh control logic for setting a new estimated mass $M_{est}$ equal to one of the most recent estimated mass $M_0$, the first vehicle mass $M_1$, and the second vehicle mass $M_2$ from each of the second control logic, the fourth control logic, and the sixth control logic each time the particular control logic is executed and the new mass estimate $M_{est}$ is calculated or initialized.

In another example of the present invention, the vehicle system of further comprises an eighth control logic that communicates the mass estimate $M_{est}$ of the seventh control logic to the vehicle control module.

In yet another example of the present invention, the vehicle system further comprises a ninth control logic that upon an initial execution of the sixth control logic repeats the sixth control logic until the ignition of the vehicle system is turned off.

In yet another example of the present invention, the seventh control logic further comprises setting a new estimated mass $M_{est}$ equal to one of the most recent estimated mass $M_0$, the first vehicle mass $M_1$, and the second vehicle mass $M_2$ wherein the new estimate mass $M_{est}=M_2$ if $M_2$ has been calculated, the new estimate mass $M_{est}=M_1$ if $M_2$ has not been calculated, and the new estimate mass $M_{est}=M_0$ if each of $M_1$ and $M_2$ have not been calculated.

In yet another example of the present invention, the sixth control logic further comprises estimating the second vehicle mass $M_2$ wherein $F_{dA}$ and $F_{dB}$ are the drive forces, $F_{bA}$ and $F_{bB}$ are the brake forces, and $a_{xA}$ and $a_{XB}$ are acceleration.

In yet another example of the present invention, the fourth control logic further comprises estimating the first vehicle mass $M_1$ wherein $F_d$ is a drive force, $P_b$ is a brake pressure, and $K_a V_x^2$ is an aerodynamic force.

In yet another example of the present invention, the vehicle system further comprises at least one of a passenger, a payload, and a trailer.

Further features and advantages of the present disclosure will become apparent by reference to the following description and appended drawings wherein like reference numbers refer to the same component, element or feature.

DRAWINGS

The drawings described herein are for illustration purposes only and are not intended to limit the scope of the present disclosure in any way;

DETAILED DESCRIPTION

The following description is merely exemplary in nature and is not intended to limit the present disclosure, application, or uses.

Figure 1:
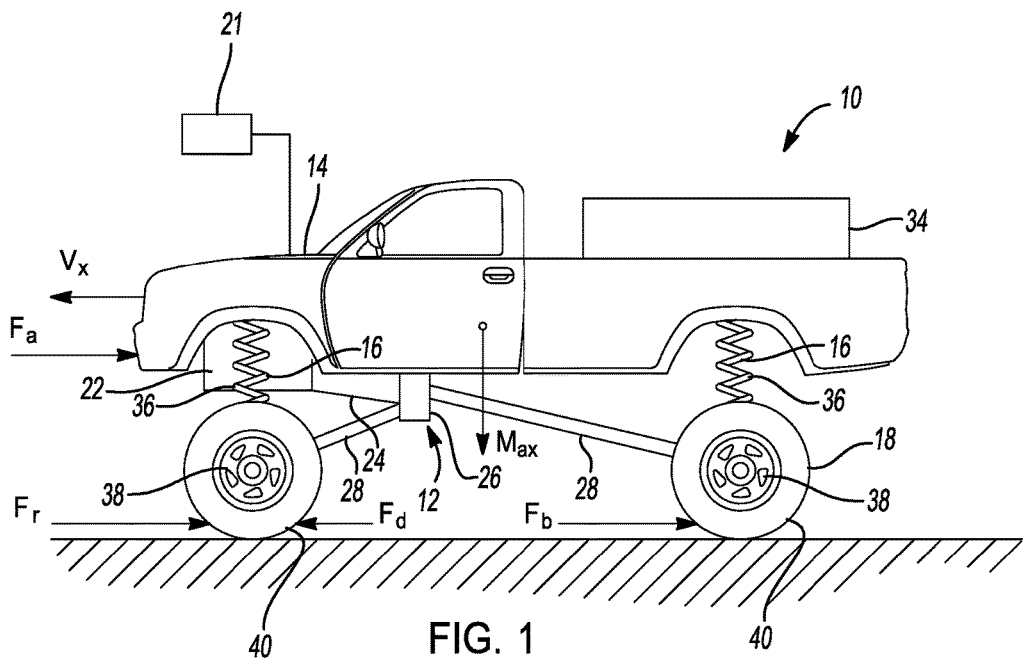
FIG. 1 is a schematic of a dynamic vehicle system according to the present disclosure.

With reference to FIG. 1, an exemplary schematic for a vehicle system, generally indicated by reference number 10, is depicted and will now be described. The vehicle system 10 in the present example is shown as a light duty pick-up truck having the capacity of transporting several occupants and several hundred pounds or kilograms in cargo in the truck bed. In one example of the present invention, a vehicle system 10 also includes a trailer (not shown) connected to the rear of the vehicle system 10 thus providing the capability of adding to the weight capacity of the vehicle system 10. In another example of the present invention, the vehicle system 10 primary purpose is for transporting passengers such as a school bus or a transit bus that is continuously picking up or dropping off passengers. Thus, the capability of the vehicle system to have up to several thousand pounds of additional weight adds to the complexity of operating the vehicle system when just a small amount of weight change can cause the vehicle system 10 to react differently to the same road conditions. Therefore, the importance of knowing the instantaneous mass M of the vehicle is increased. Estimating the mass M of the vehicle system 10 starts with the following equation:

$$F_x = Ma_x \quad [1], \text{ or}$$

$$M = F_x/a_x \quad [2],$$

where $F_x$ is sum of the forces acting on the vehicle system and ax is the acceleration or gravity which also includes a road grade component.

The vehicle system 10 includes a powertrain 12, a body 14, a suspension 16, wheels 18, a brake system 20, and a vehicle or powertrain control module 21. More particularly, the powertrain 12 provides torque to the wheels 18 through several components. In this example, the powertrain 18 includes an internal combustion engine 22, a transmission 24, a transfer case 26, a front and rear driveshafts 28, front and rear differentials (not shown), and front and rear axles (not shown). The engine 22 produces torque which is passed through the various gear ratios of the transmission 24 to the transfer case 26. The transfer case 26 selectively transfers torque to the front and rear differentials through the front and rear driveshafts 28. The differentials distribute the torque to the wheels 18. In another example, the powertrain 12 may produce torque through an electric motor or a combination of an electric motor and an internal combustion engine 22 without departing from the scope of the invention. The torque produced and distributed by the powertrain 12 applies a drive force $F_d$ on the vehicle system 10.

The body 14 of the vehicle system 10 includes a passenger compartment 30, a payload bed 32, and has a frontal area A. The passenger compartment 30 and payload bed 32 are portions of the vehicle system 10 capable of carrying or offloading passengers and payloads 34. The frontal area A determines a major portion of an aerodynamic drag force $F_a$, as defined in the following equation:

$$F_a = \frac{1}{2}\rho V_x^2 C_d A \quad [3]$$

where ρ is air density, $V_x$ is vehicle system 10 velocity; $C_d$ is an aerodynamic drag coefficient. For the purposes of this invention, air density ρ, and the aerodynamic drag coefficient $C_d$ will be combined to a constant $X_a$ to give the equation $$F_a = X_a V_x^2 A \quad [4]$$

where the only variables are the velocity $V_x$ and the frontal area A of the vehicle system 10. However, in many calculations the frontal area A is considered constant even while adding to the frontal area of the vehicle system 10 in the form of a trailer. Thus, using the previous equation with the frontal area A as a constant and not including a measurement of the total frontal area A will be a source of error or inaccuracy. Therefore, for a given vehicle system 10 the equation for determining the aerodynamic force Fa is reduced to $$F_a = K_a V_x^2 \quad [5]$$

where Ka is the constant including air density ρ, the aerodynamic drag coefficient $C_d$, and a constant frontal area A.

The suspension 16 of the vehicle system 10 includes springs 36, shocks or dampers (not shown), and various other components making it possible to control the vehicle system 10 and carry passengers and payloads. The mass M of the vehicle system 10 includes sprung mass, unsprung mass, payload, and passengers. The sprung mass includes the mass of the vehicle system 10 that is supported by the springs 36 of the suspension 16. The unsprung mass includes the mass of the portion of the powertrain that is supported by the wheels 18 such as the front and rear differentials, axles, and a portion of the driveshafts 28.

The brake system 20 of the vehicle system 10 provides the stopping power or brake force $F_b$ for slowing or causing the vehicle system 10 to decelerate. The brake force $F_b$ is found using the equation:

$$F_b = K_b P_b \quad [6],$$

where $P_b$ is the brake system pressure and $K_b$ is a constant.

The wheels 18 of the vehicle system 10 include at least a hub 38 and a tire 40. The hub is fixed to the end of one of the axles of the powertrain 12. The tire 40 is mounted to the hub 38 and is the point of contact between the vehicle system 10 and the road surface. A road friction Fr component of the forces acting on the vehicle system 10 is due to the rolling resistance of the tires 40. Several factors affect rolling resistance including tire temperature, tire pressure, velocity, tire material and design, and tire slip. In general, a friction coefficient μ is used to calculate road friction Fr that represents the various factors. Thus, the equation for road friction is given as:

$$F_r = \mu M_g \quad [7],$$

where the friction coefficient μ is a constant and g is gravity.

As a result, the total force $F_x$ acting on the vehicle system 10 is estimated using the following equations:

$$F_x = F_d - F_b - F_a - F_r \quad [8], \text{ or}$$

$$F_x = F_d - K_b P_b - K_a V_x^2 - \mu M g \qquad [9]$$

and $$F_x = M a_x \qquad [10].$$

Finding for the mass M of the vehicle system 10 results in the following equation:

$$M(a_x + \mu g) = F_d - K_b P_b - K_a V_x^2 \qquad [11].$$

However, a major shortfall with applying this equation directly to the estimation of the mass M of the vehicle system 10 is that the assumption of the terms $K_b$, $K_a$, and $\mu$ as being constant is not necessarily a good assumption. For example, the friction coefficient $\mu$, as stated above, changes with tire pressure and temperature and with dynamic road conditions. The aerodynamic coefficient $K_a$ will change greatly with the addition of a trailer; especially if the trailer height or width creates a larger frontal area A. The brake coefficient $K_b$ can change as the brake hardware is worn or as the brake temperature changes. Furthermore, while the road grade term $a_x$ results from a sensor reading and not a constant, the road grade term $a_x$ may include an unknown pitch angle term brought on by deflection of the suspension 16.

Figure 2:
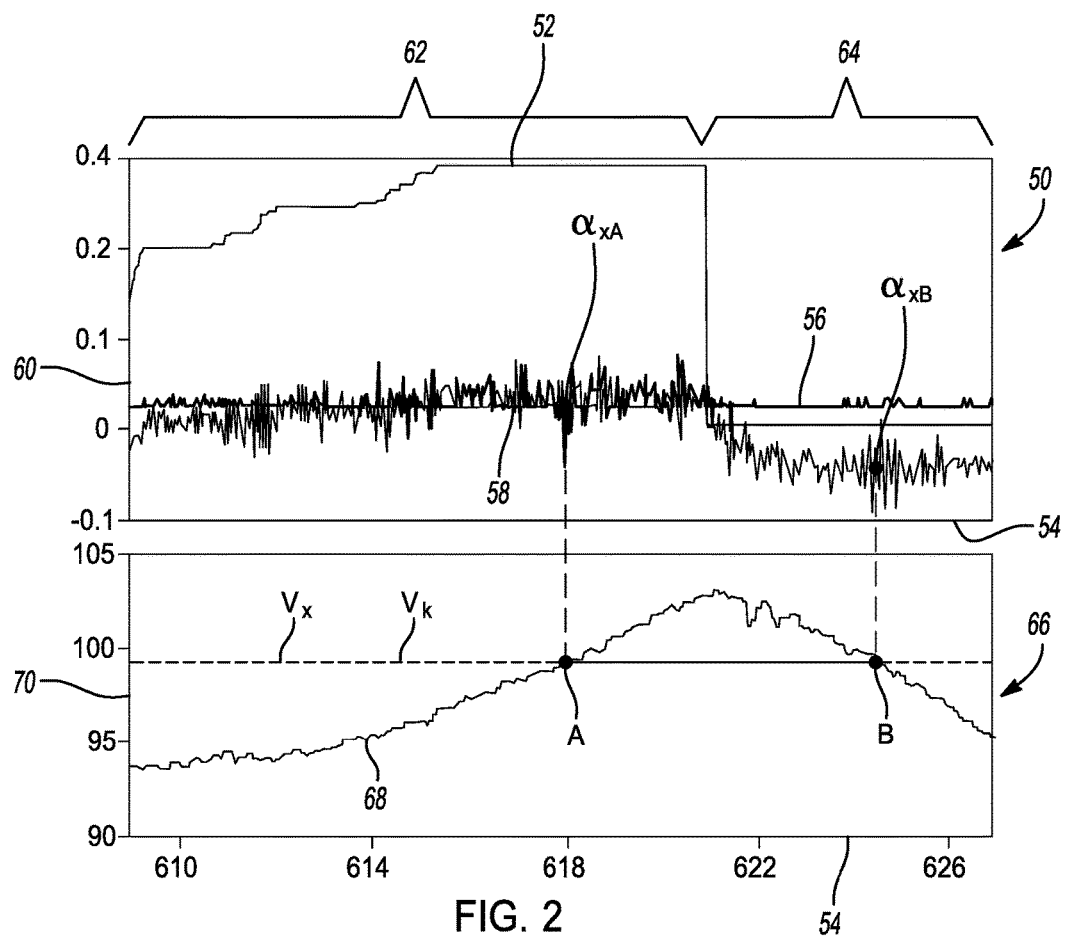
FIG. 2 is a graph detailing data collected during a dynamic event for a vehicle according to the present disclosure.
Figure 3:
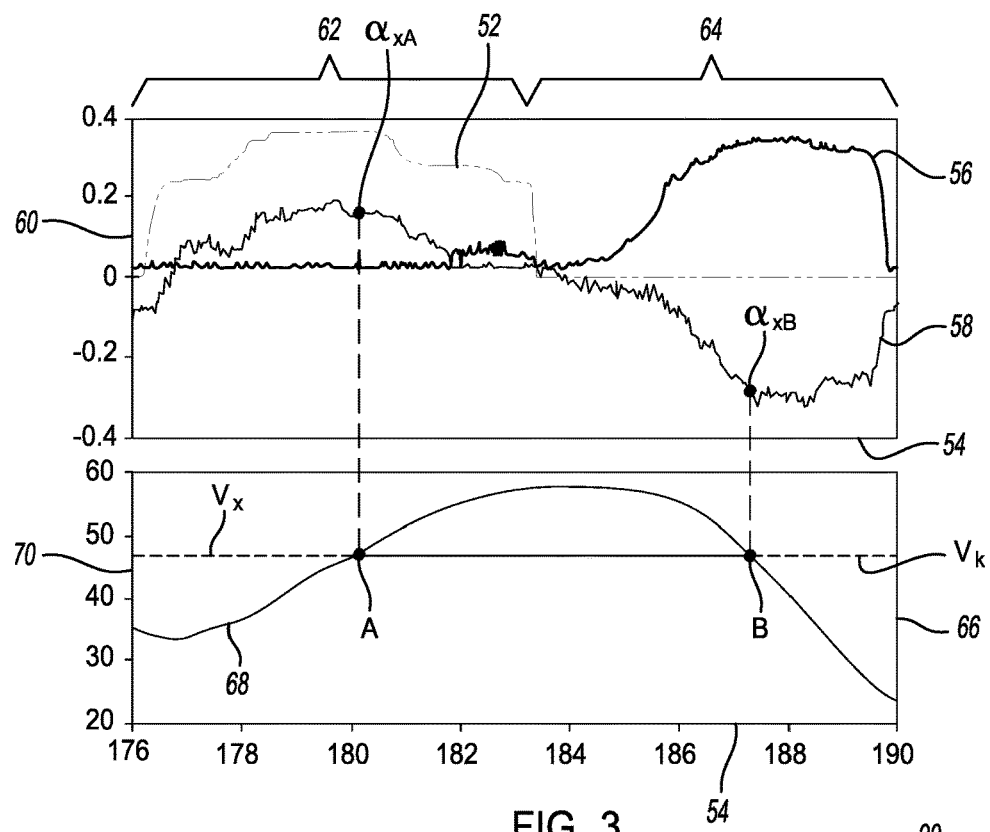
FIG. 3 is a graph detailing data collected during a dynamic event for a vehicle according to the present disclosure.

Turning now to FIGS. 2 and 3, a method of estimating the mass M of the vehicle system 10 is demonstrated using graphs. Each of the FIGS. 2 and 3 depict an event such as dynamic acceleration-to-deceleration event, acceleration-to-coasting event, or a deceleration-to-acceleration event. The top or first graph 50 of FIG. 2 shows the position of the throttle pedal 52 vs. time [s] 54, the position of the brake pedal 56 vs. time[s] 54, and the overall acceleration term $a_x[g]$ 58, shown on the y-axis 60, vs. time[s] 54 of the event. In particular, graph 50 depicts an acceleration-to-coasting event. Thus the event entails a throttle pedal position steadily increasing 62, then a lift-off the throttle pedal 64 without any depression of the brake pedal. During the acceleration portion 62, the acceleration term $a_x$ is between 0.01 g and 0.02 g. The coasting portion 64 results in acceleration of about −0.3 g to −0.05 g. The bottom or second graph 66 of FIG. 2 traces the actual velocity $V_a$ 68 in km/h (y-axis) 70 vs. time[s] 54 over the course of the event. The method either uses a preset velocity constant $V_k$ or selects a velocity $V_x$ using a routine. In whichever manner, a velocity $V_x$ is chosen to intersect with the actual velocity $V_a$ and two data points A and B are recorded.

Applying the above equation to data point A and data point B results in the following equations:

$$M(a_{xA} + \mu g) = F_{dA} - K_b P_{bA} - K_a V_{xA}^2 \qquad [12]$$

$$M(a_{xB} + \mu g) = F_{dB} - K_b P_{bB} - K_a V_{xB}^2 \qquad [13].$$

Since $V_{xA}^2 = V_{xB}^2$ due to the data points A and B taken at a constant Velocity Vx, the equations reduce to:

$$M(a_{xB} - a_{xA}) = (F_{dB} - K_b P_{bB}) - (F_{dA} - K_b P_{bA}) \qquad [14],$$

or $$M(a_{xB} - a_{xA}) = (F_{dB} - F_{bB}) - (F_{dA} - F_{bA}) \qquad [15].$$

Furthermore, since this particular event is an acceleration-to-coasting event, the brake forces $F_{bA}$, $F_{bB}$ and drive force $F_{dB}$ are zero resulting in the following equation:

$$M(a_{xB} - a_{xA}) = -F_{dA} \qquad [16].$$

When considering the other events such as the acceleration-to-deceleration event depicted in FIG. 3, the brake force $F_{bA}$ and the drive force $F_{dB}$ are zero, thus:

$$M(a_{xB} - a_{xA}) = -F_{bB} - F_{dA} \qquad [17].$$

Furthermore, when applying the equation to a deceleration-to-acceleration event, the brake force $F_{bB}$ and the drive force $F_{dA}$ are zero, providing:

$$M(a_{xB} - a_{xA}) = F_{dB} + F_{bA} \qquad [18].$$

The method as depicted in the graphs 50, 66 of FIGS. 2 and 3 require several inputs from existing sensors or hardware which with vehicles are already equipped. The inputs for the method include total axle drive torque, brake pressure (or regenerative brake torques if the vehicle system 10 is so equipped), longitudinal acceleration, throttle pedal position, brake pedal position, and straight line driving detection. For example, the total axle drive torque is used to calculate the drive force $F_d$. Brake pressure for each wheel 18 is required to calculate brake force $F_b$. Straight line detection is required to rule out other dynamic force variables in the mass estimation calculation.

Figure 5:
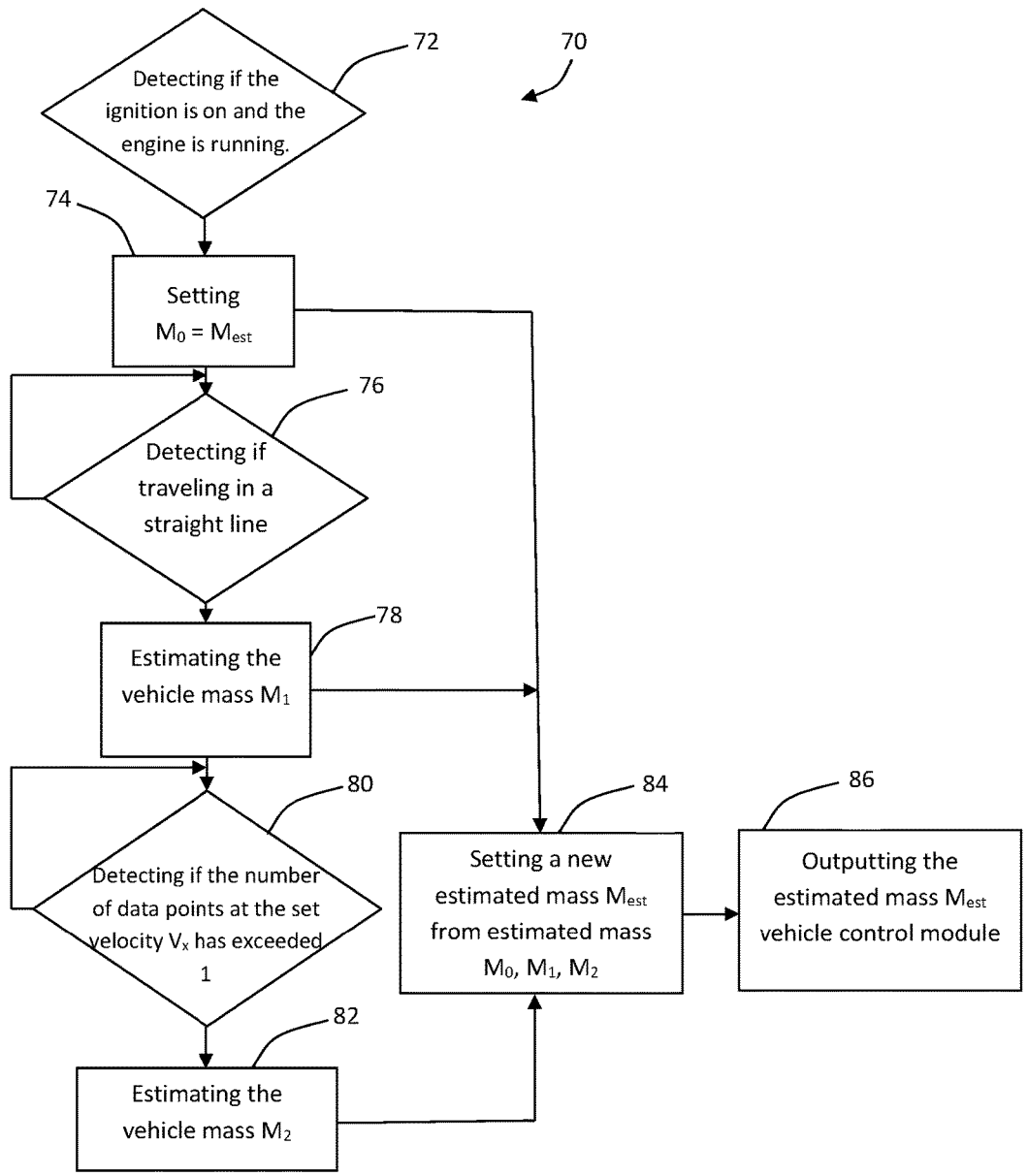
FIG. 5 is a flowchart detailing the steps of a method for vehicle mass estimation according the present disclosure.

Referring now to FIG. 5, a flowchart depicts a method 70 of estimating the mass $M_{est}$ of the vehicle system 10 as featured in the graphs 50, 66 of FIGS. 2 and 3. The method 70 includes a first step 72 for detecting if the vehicle system 10 ignition is on and the engine is running. A second step 74 of the method 70 initializes a variable $M_0$ representing the most recent estimated mass $M_{est}$ in memory. A third step 76 detects if the vehicle system 10 is traveling in a straight line. If the vehicle system 10 is not traveling in a straight line, the third step 76 repeats until the vehicle system 10 is traveling in a straight line. Once the vehicle system 10 detects that the vehicle system 10 is traveling in a straight line, a fourth step 78 estimates the vehicle mass $M_1$ using the equation [11] from above:

$$M_1(a_x + \mu g) = F_d - K_b P_b - K_a V_x^2 \qquad [11].$$

A fifth step 80 of the method 70 detects if the number or data points at the set velocity $V_x$ has exceeded 1. If the number or data points at the set velocity $V_x$ has not exceeded 1, the fifth step 80 repeats until the number or data points at the set velocity $V_x$ has exceeded 1. This effectively detects when one of the three events occurs; the acceleration-to-deceleration event, the acceleration-to-coasting event, or the deceleration-to-acceleration event. Once the number or data points at the set velocity $V_x$ have exceeded 1, a sixth step 82 estimates the vehicle mass $M_2$ using the equation [15] from above:

$$M_2(a_{xB} - a_{xA}) = (F_{dB} - F_{bB}) - (F_{dA} - F_{bA}) \qquad [15].$$

A seventh step 84 sets a new estimated mass $M_{est}$ from estimated mass $M_0$, $M_1$, $M_2$ from each of the second step 72, the fourth step 76, and the sixth step 82 each time the particular step is executed and a mass estimate $M_0$, $M_1$, $M_2$ is calculated or initialized. An eighth step 86 outputs the estimated mass $M_{est}$ from the seventh step 84 to the vehicle control module. Once the sixth step 82 is executed a first time, the sixth step 82 repeats until the ignition of the vehicle system is turned off.

The vehicle control module 21 is electronically connected to at least the powertrain 12 and sensors throughout the vehicle system 10 is preferably an electronic control device having a preprogrammed digital computer or processor, control logic, memory used to store data, and at least one I/O peripheral. The control logic includes a plurality of logic routines for monitoring, manipulating, and generating data. The vehicle control module 21 controls the operation of the powertrain 12 and other actuatable mechanisms of the vehicle system 10. The control logic may be implemented in hardware, software, or a combination of hardware and software. For example, control logic may be in the form of program code that is stored on the electronic memory storage and executable by the processor. The vehicle control module 21 receives the output signals of several sensors throughout the transmission and engine, performs the control logic and sends command signals to the vehicle system 10. The vehicle system 10 receives command signals from the vehicle control module 21 and converts the command signals to control actions operable in the vehicle system 10. Some of the control actions include but are not limited to increasing engine 22 speed, changing air/fuel ratio, changing transmission 24 gear ratios, altering suspension 16 control parameters, etc., among many other control actions.

For example, a control logic implemented in software program code that is executable by the processor of the vehicle control module 21 includes control logic for implementing a method of estimating the mass $M_{est}$ of the vehicle system 10 as featured in the graphs 50, 66 of FIGS. 2 and 3. The control logic includes a first control logic for detecting if the vehicle system 10 ignition is on and the engine is running. A second control logic initializes a variable $M_0$ representing the most recent estimated mass $M_{est}$ in memory. The third control logic detects if the vehicle system 10 is traveling in a straight line. If the vehicle system 10 is not traveling in a straight line, the third control logic repeats until the vehicle system 10 is traveling in a straight line. Once the vehicle system 10 detects that the vehicle system 10 is traveling in a straight line, the fourth control logic estimates the vehicle mass $M_1$ using the equation [11] from above:

$$M_1(a_x + \mu g) = F_d - K_b P_b - K_a V_x^2 \quad [11].$$

The fifth control logic detects if the number or data points at the set velocity $V_x$ has exceeded 1. If the number or data points at the set velocity $V_x$ has not exceeded 1, the fifth control logic repeats until the number or data points at the set velocity $V_x$ has exceeded 1. Once the number or data points at the set velocity $V_x$ have exceeded 1, a sixth control logic estimates the vehicle mass $M_2$ using the equation [15] from above:

$$M_2(a_{xB} - a_{xA}) = (F_{dB} - F_{bB}) - (F_{dA} - F_{bA}) \quad [15].$$

A seventh control logic sets a new estimated mass $M_{est}$ from estimated mass $M_0$, $M_1$, $M_2$ from each of the second control logic, the fourth control logic, and the sixth control logic each time the particular step is executed and a mass estimate $M_0$, $M_1$, $M_2$ is calculated or initialized. An eighth control logic outputs the estimated mass $M_{est}$ from the seventh control logic to the vehicle control module. Once the sixth control logic is executed a first time, the sixth control logic repeats until the ignition of the vehicle system is turned off.

Figure 4:
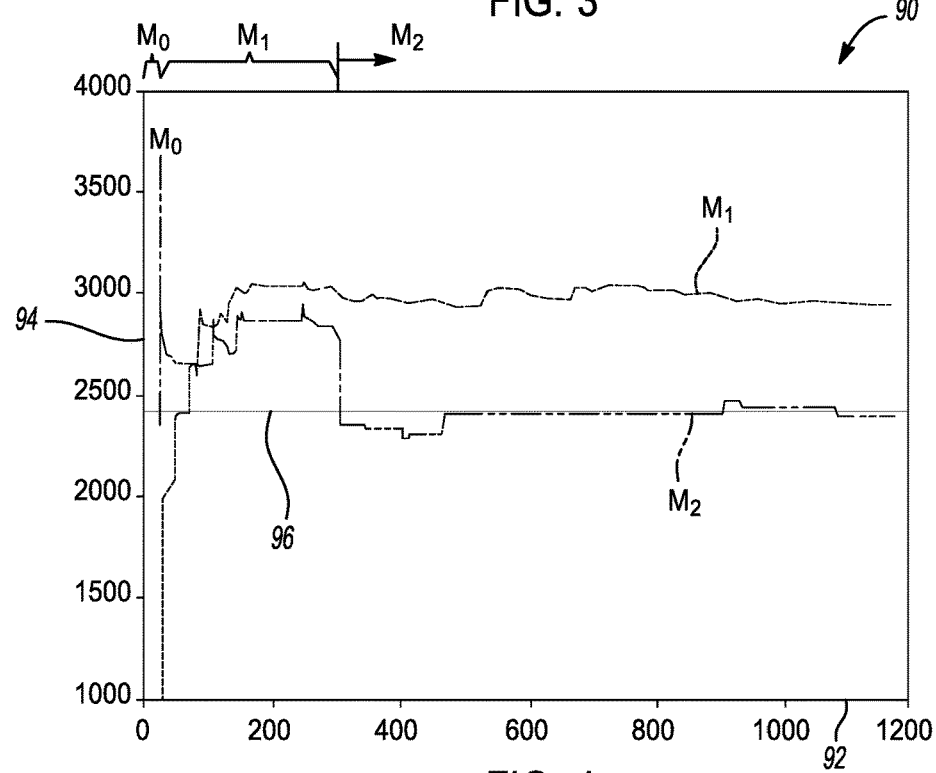
FIG. 4 is a graph comparing the accuracy of the mass estimation method of the present disclosure to the prior art mass estimation method.

Turning now to FIG. 4, a graph 90 presents a data set as generated by the operation of the method 70 depicted in FIG. 5. The graph 90 includes an x-axis 92 representing time (s) beginning with ignition of the engine 22 of the vehicle system 10. The y-axis 94 represents the mass of the vehicle (kg) both actual and estimated $M_{est}$. The actual mass 96 of the vehicle system 10 is constant in this example. During the first seconds of ignition, the estimated mass $M_{est}$ is set to $M_0$ or the most recent estimated mass $M_{est}$ prior to shutdown of the vehicle system 10. For the next approximately 280 seconds of ignition, the estimated mass $M_{est}$ is set to $M_1$ and is shown having an error of approximately 25%. At approximately 300 s after ignition, the estimated mass $M_{est}$ is set to $M_2$ which is shown have a significantly reduced error at less than 5%.

The description of the disclosure is merely exemplary in nature and variations that do not depart from the gist of the disclosure are intended to be within the scope of the disclosure. Such variations are not to be regarded as a departure from the spirit and scope of the disclosure.

What is claimed is:

1. A method for estimating the mass of a vehicle system, the method comprising:
    providing a vehicle system having a vehicle control module and a powertrain having an ignition system;
    detecting if the ignition system is on;
    initializing an initial mass $M_0$ representing a most recent estimated mass $M_{est}$ in a stored memory of the vehicle control module;
    detecting if the vehicle system is traveling in a straight line until the vehicle system is detected traveling in a straight line;
    estimating a first estimated mass $M_1$;
    detecting an event in which a change in acceleration occurs, wherein the acceleration of the vehicle system changes from positive to negative or the acceleration of the vehicle system changes from negative to positive;
    recording a first and a second data points, wherein the first data point is when the velocity of the vehicle system is $V_x$ before the event in which a change in acceleration occurs and the second data point is when the velocity of the vehicle system is $V_x$ after the event in which a change in acceleration occurs; and
    using the first and second data points to calculate a second estimated mass $M_2$.

2. The method for estimating the mass of a vehicle system of claim 1 further comprising setting a new estimated mass $M_{est}$ from the initial, first estimated and second estimated mass $M_0$, $M_1$, $M_2$.

3. The method for estimating the mass of a vehicle system of claim 2 wherein setting a new estimated mass $M_{est}$ from the initial, first estimated and second estimated mass $M_0$, $M_1$, $M_2$ further comprises setting a new estimated mass $M_{est}$ from the initial, first estimated and second estimated mass $M_0$, $M_1$, $M_2$ wherein the new estimate mass $M_{est} = M_2$ if $M_2$ has been calculated, the new estimated mass $M_{est} = M_1$ if $M_2$ has not been calculated, and the new estimated mass $M_{est} = M_0$ if each of $M_1$ and $M_2$ have not been calculated.

4. The method for estimating the mass of a vehicle system of claim 2 further comprising communicating the new estimated mass $M_{est}$ to the vehicle control module.

5. The method for estimating the mass of a vehicle system of claim 1 wherein estimating a first estimated mass $M_1$ further comprises estimating a second estimated mass $M_1$ using the equation $$M_1 = \frac{F_d - K_b P_b - K_a V_x^2}{(a_x + \mu g)}$$

and
    wherein $F_d$ is a drive force, $P_b$ is a brake pressure, and $K_a V_x^2$ is an aerodynamic force.

6. The method for estimating the mass of a vehicle system of claim 1 wherein using the first and second data points to calculate a third estimated mass $M_3$ further comprises using the first and second data points to calculate a second estimated mass $M_2$ using the equation $$M_2 = \frac{(F_{dB} - F_{bB}) - (F_{dA} - F_{bA})}{(a_{xB} - a_{xA})}$$

and
wherein $F_{dA}$ and $F_{dB}$ are drive forces, $F_{bA}$ and $F_{bB}$ are brake forces, and $a_{xA}$ and $a_{xB}$ are measured acceleration.

7. The method for estimating the mass of a vehicle system of claim 1 wherein using the first and second data points to calculate a third estimated mass $M_3$ further comprises using the first and second data points to calculate a second estimated mass $M_2$ using the equation $$M_2 = \frac{(F_{dB} - F_{bB}) - (F_{dA} - F_{bA})}{(a_{xB} - a_{xA})}$$

and
wherein $F_{dA}$ is the drive force at the first data point, $F_{dB}$ is the drive force a the second data point, $F_{bA}$ is the brake force at the first data point, $F_{bB}$ is the brake force at the second data points, and $a_{xA}$ and $a_{xB}$ are the measured acceleration at the first and second data points, respectively.

8. A method for estimating the mass of a vehicle system, the method comprising:
providing a vehicle system having a vehicle control module and a powertrain having an ignition system
detecting if the ignition of the vehicle system is on;
initializing an initial mass $M_0$ representing a most recent estimated mass $M_{est}$ in a stored memory of the vehicle control module;
detecting if the vehicle system is traveling in a straight line until the vehicle system is detected to be traveling in a straight line;
estimating a first estimated mass $M_2$ using the equation $$M_1 = \frac{F_d - K_b P_b - K_a V_x^2}{(a_x + \mu g)};$$

detecting an event in which a change in acceleration occurs, wherein the acceleration of the vehicle system goes from positive to negative or the acceleration of the vehicle system goes from negative to positive;
recording a first and a second data points, wherein the first data point is when the velocity of the vehicle system is $V_x$ before the event and the second data point is when the velocity of the vehicle system is $V_x$ after the event;
estimating a second estimated mass $M_3$ using the equation $$M_2 = \frac{(F_{dB} - F_{bB}) - (F_{dA} - F_{bA})}{(a_{xB} - a_{xA})};$$

setting a new estimated mass $M_{est}$ from the initial, first estimated and second estimated mass $M_0$, $M_1$, $M_2$, and communicating the new estimated mass $M_{est}$ to the vehicle control module.

9. The method for estimating the mass of a vehicle system of claim 8 wherein setting a new estimated mass $M_{est}$ from the initial, first estimated and second estimated mass $M_0$, $M_1$, $M_2$ further comprises setting a new estimated mass $M_{est}$ from the initial, first estimated and second estimated mass $M_0$, $M_1$, $M_2$ wherein the new estimate mass $M_{est}=M_2$ if $M_2$ has been calculated, new estimate mass $M_{est}=M_1$ if $M_2$ has not been calculated, and new estimate mass $M_{est}=M_0$ if each of $M_1$ and $M_2$ have not been calculated.

10. The method for estimating the mass of a vehicle system of claim 9 wherein estimating a first estimated mass $M_1$ using the equation $$M_1 = \frac{F_d - K_b P_b - K_a V_x^2}{(a_x + \mu g)}$$

further comprises estimating a second estimated mass $M_2$ using the equation $$M_1 = \frac{F_d - K_b P_b - K_a V_x^2}{(a_x + \mu g)}$$

and
$F_d$ is a drive force, $P_b$ is a brake pressure, and $K_a V_x^2$ is an aerodynamic force.

11. The method for estimating the mass of a vehicle system of claim 10 wherein estimating a third estimated mass $M_3$ using the equation $$M_2 = \frac{(F_{dB} - F_{bB}) - (F_{dA} - F_{bA})}{(a_{xB} - a_{xA})}$$

further comprises estimating a third estimated mass $M_3$ using the equation $$M_2 = \frac{(F_{dB} - F_{bB}) - (F_{dA} - F_{bA})}{(a_{xB} - a_{xA})}$$

and
$F_{dA}$ and $F_{dB}$ are drive forces, $F_{bA}$ and $F_{bB}$ are brake forces, and $a_{xA}$ and $a_{xB}$ are acceleration.

12. The method for estimating the mass of a vehicle system of claim 11 wherein estimating a second estimated mass $M_3$ using the equation $$M_2 = \frac{(F_{dB} - F_{bB}) - (F_{dA} - F_{bA})}{(a_{xB} - a_{xA})}$$

further comprises estimating a third estimated mass $M_3$ using the equation $$M_2 = \frac{(F_{dB} - F_{bB}) - (F_{dA} - F_{bA})}{(a_{xB} - a_{xA})}$$

and
wherein $F_{dA}$ is the drive force at the first data point, $F_{dB}$ is the drive force a the second data point, $F_{bA}$ is the brake force at the first data point, $F_{bB}$ is the brake force at the second data points, and $a_{xA}$ and $a_{xB}$ are the measured acceleration at the first and second data points respectively.

13. A vehicle system comprising:
a vehicle body having a frontal area A having a constant $K_a$;
a powertrain disposed within the body of the vehicle system and having an ignition system, and wherein the powertrain selectively provides a drive force $F_d$ on the vehicle system;

at least two wheels;

a brake system disposed in the body and the at least two wheels, and wherein the brake system selectively provides a brake force $F_b$ on the vehicle system;

a suspension system disposed between the at least two wheel and the body and powertrain, wherein the suspension supports the body and powertrain upon the at least two wheels; and a vehicle control module electronically connected to the vehicle system, the vehicle control module has control logic operable to control a plurality of dynamic driving parameters of the vehicle system, the control logic including:

a first control logic for detecting if the ignition system is on and the powertrain is running;

a second control logic initializes a variable $M_0$ representing the most recent estimated mass $M_{est}$ in memory;

a third control logic detects if the vehicle system is traveling in a straight line, and wherein if the vehicle system is not traveling in a straight line, the third control logic repeats until the vehicle system is traveling in a straight line;

a fourth control logic estimates a first vehicle mass $M_1$ using the equation $$M_1(a_x+\mu g)=F_d-K_bP_b-K_aV_x^2;$$

a fifth control logic detects if the number of data points at the set velocity $V_x$ has exceeded 1, and wherein if the number of data points at the set velocity $V_x$ has not exceeded 1, the fifth control logic repeats until the number of data points at the set velocity $V_x$ has exceeded 1 and recording a first and a second data points, the first data point is recorded the at the first time the set velocity $V_x$ is reached, and the second data point is recorded at the second the set velocity $V_x$ is reached; and a sixth control logic estimates a second vehicle mass $M_2$ using the equation $$M_2(a_{xB}-a_{xA})=(F_{dB}-F_{bB})-(F_{dA}-F_{bA}).$$

14. The vehicle system of claim 13 further comprising a seventh control logic sets a new estimated mass $M_{est}$ equal to one of the most recent estimated mass $M_0$, the first vehicle mass $M_1$, and the second vehicle mass $M_2$ from each of the second control logic, the fourth control logic, and the sixth control logic each time the particular step is executed and the new mass estimate $M_{est}$ is calculated or initialized.

15. The vehicle system of claim 14 further comprising an eighth control logic that communicates the mass estimate $M_{est}$ of the seventh control logic to the vehicle control module.

16. The vehicle system of claim 15 further comprising a ninth control logic that upon an initial execution of the sixth control logic repeats the sixth control logic until the ignition of the vehicle system is turned off.

17. The vehicle system of claim 16 wherein the seventh control logic further comprises setting a new estimated mass $M_{est}$ equal to one of the most recent estimated mass $M_0$, the first vehicle mass $M_1$, and the second vehicle mass $M_2$ wherein the new estimate mass $M_{est}=M_2$ if $M_2$ has been calculated, the new estimate mass $M_{est}=M_1$ if $M_2$ has not been calculated, and the new estimate mass $M_{est}=M_0$ if each of $M_1$ and $M_2$ have not been calculated.

18. The vehicle system of claim 17 wherein the sixth control logic of estimating the second vehicle mass $M_2$ using the equation $$M_2 = \frac{(F_{dB} - F_{bB}) - (F_{dA} - F_{bA})}{(a_{xB} - a_{xA})},$$

further comprises estimating the second vehicle mass $M_2$ wherein $F_{dA}$ and $F_{dB}$ are the drive forces, $F_{bA}$ and $F_{bB}$ are the brake forces, and $a_{xA}$ and $a_{xB}$ are acceleration.

19. The vehicle system of claim 18 wherein the fourth control logic of estimating the first vehicle mass $M_1$ using the equation $$M_1 = \frac{F_d - K_bP_b - K_aV_x^2}{(a_x + \mu g)}$$

further comprises estimating the first vehicle mass $M_1$ wherein $F_d$ is a drive force, $P_b$ is a brake pressure, and $K_aV_x^2$ is an aerodynamic force.

20. The vehicle system of claim 19 further comprising at least one of a passenger, a payload, and a trailer.

* * * * *